Patented Feb. 23, 1932

1,846,575

UNITED STATES PATENT OFFICE

RICHARD WEINGAND, OF BOMLITZ, NEAR WALSRODE, GERMANY

MANUFACTURING ARTICLES FROM CELLULOSE COMPOUNDS

No Drawing. Application filed January 23, 1929, Serial No. 334,415, and in Germany January 25, 1928.

This invention has reference to thin, substantially sheet-like carriers for the graphic, photographic and similar arts and in particular to those flexible kinds of carriers composed of plastic organic compounds, such as cellulose-derivatives and the like and it comprises among other objects and advantages an improvement in this art by which the adaptability and the receptiveness of the carriers for the fixation of reproductions and the like, and the distinctness thereof are greatly increased, and the process of manufacture is generally simplified. In the graphic, photographic and similar arts sheet-like or pellicle-like carriers are required which, besides possessing the valuable properties of the cellulose-esters, that is to say, strength, flexibility, plasticity, chemical resistance and absence of swelling when submitted to the action of water and steam, can be readily printed upon and are only difficultly combustible, only slightly explosive and are well adapted for the reception of chemicals, dyes and coloring agents generally. In the utilization of acetate artificial silk-material it has been suggested to meet these requirements by submitting the threads to a superficial saponification, and thereby to convert them into the highly reactive cellulose-hydrates. This method, however, cannot be used in the case of thin flat structures of this kind, such as films, foils and the like, inasmuch as with these articles a uniform permeation of the saponifying agent into the layer, as required for practical purposes cannot be obtained, while the complete removal of the saponificant and of the reaction-products present great difficulties.

Now my invention is distinguished from this state of the art by the fact that films or foils and the like possessing the above mentioned qualities may be manufactured as a kind of compound articles. For this purpose a sheet, foil or film of celluloid or of others cellulose-esters and a sheet, film or foil of cellulose, recovered cellulose or cellulose-ether are pasted or stuck together in such a manner that a compound article is obtained which is no longer soluble in water. A compound-body of this kind may be easily printed upon, colored or provided with a graphical coating on the side of the hydrate-cellulose. In view of the superior absorbing qualities of this layer for solutions and solvents it is possible to even perform chemical reactions therein. On the other hand, there is the additional advantage as regards the celluloid layer that its inflammability is reduced as a result of the diminished inflammability and burning qualities of the layer of cellulose-hydrate. Moreover, the layer of celluloid increases the adaptability of the layer of cellulose-hydrate, inasmuch as the comparative absence of changes of volume of the celluloid is communicated to the layer of cellulose-hydrate. There is the additional advantage that the entire compound body obtained possesses great mechanical strength and is highly and readily flexible.

In view of the fact that it is of importance for various uses to keep the compound-body under water for some time, the pasting together of the foils or films is preferably effected by means of a water-proof adhesive. In view thereof the invention provides the application to the celluloid-foil or sheet of a coating of albuminous matter which admits of being hardened, such as gelatine, albumine, casein, or of a coating of a condensation product of urea and formaldehyde, whereupon the layer or foil of cellulose is applied and is rendered water-insoluble by the treatment with hardening agents, such as aldehydes and its polymeres, quinones and alum and with their equivalents.

In accordance with a modified form of my invention I may alternatingly superimpose a plurality of foils or films of water-absorbing and consequently swelling and respectively non-swelling cellulose-material and combine them into a compound article. The process of manufacture may also be made continuous by causing the sheets, films or bands to be for instance unrolled from their respective rollers and by applying the adhesive onto and between the sheets, the entire system being then led through a hardening bath. The excess of the hardening agent is removed by evaporation or by drying, and the compound-body thus obtained is then rolled up.

In the course of my experiments in pursuance of my invention it has been ascertained that the adhesiveness and the waterproof qualities are particularly great, if an albuminous body is employed in solution prepared with a solvent which possesses also the property of dissolving cellulose-esters. This treatment results in an exceedingly thorough interlocking engagement of the foils or films of cellulose-hydrate with those of cellulose-esters, inasmuch as the albuminous matter permeates the layer of cellulose hydrate, while on the other hand the solvent produces an initial solution of the surface particles of the film or foil of cellulose-esters, so as to thereby obtain a continuous merging transition of the different layers to be united.

As an albuminous matter gelatine will be preferable for many purposes and glacial acetic acid as a solvent. The albuminous matter may be subsequently hardened by known means, such as for instance by formaldehyde or sulfate of alumina, in order to increase the water-proof qualities of the compound body. With a view of increasing the flexibility of the compound film or foil a softening agent may be added, such as camphor or the like, which is preferably incorporated with the pasting solution.

As many modifications will suggest themselves to the expert, it will be understood that the invention is not limited to the specific substances and steps herein enumerated by way of exemplification only and the scope of the invention is not to be confined thereto, except as otherwise appears from the appended claims.

I claim:—

1. As a new article of manufacture, a composite sheet material consisting of one self-sustaining translucent foil of cellulose swelling in water and of one self-sustaining translucent foil of a cellulose derivative not swelling in water, said foils being united together.

2. As a new article of manufacture, a composite sheet material consisting of one self-sustaining translucent foil of regenerated cellulose swelling in water and of one self-sustaining foil of a cellulose derivative not swelling in water, said foils being stuck together by an intermediate adhesive layer.

3. As a new article of manufacture, a composite sheet material consisting of at least two superimposed self-sustaining translucent foils respectively of cellulose swelling in water and of cellulose derivatives not swelling in water, united together by an agglutinant rendered insoluble in water.

4. As a new article of manufacture, a composite sheet material consisting of at least two superimposed self-sustaining transparent foils respectively of cellulose swelling in water and of cellulose derivatives not swelling in water, united together by an agglutinant consisting of an albuminoid.

5. As a new article of manufacture, a composite sheet material comprising at least one self-sustaining transparent foil of cellulose swelling in water combined with at least one self-sustaining foil of a cellulose derivative not swelling in water by means of an albuminoid dissolved in a solvent adapted also to dissolve the cellulose derivative.

6. As a new article of manufacture, a composite sheet material comprising at least two superimposed translucent self-sustaining foils respectively of cellulose swelling in water and of cellulose derivatives not swelling in water, united together by a hardened agglutinant.

7. As a new article of manufacture, a composite sheet material consisting of at least two superimposed self-sustaining translucent foils respectively of cellulose swelling in water and of cellulose derivatives not swelling in water, united together by an intermediate layer of an agglutinant containing a softening agent.

8. As a new article of manufacture, a composite sheet material comprising at least two superimposed self-sustaining translucent foils respectively of regenerated cellulose swelling in water and of cellulose derivatives not swelling in water and an intermediate layer of an agglutinant rendered insoluble in water.

9. As a new article of manufacture, a composite sheet material comprising at least two superimposed self-sustaining foils respectively of regenerated cellulose swelling in water and of cellulose derivatives not swelling in water and an intermediate uniting layer of an albuminoid.

In testimony whereof I affix my signature.

RICHARD WEINGAND.